United States Patent [19]
Derbyshire

[11] Patent Number: 5,189,271
[45] Date of Patent: Feb. 23, 1993

[54] TEMPERATURE SELF-REGULATING INDUCTION APPARATUS

[75] Inventor: Rodney L. Derbyshire, Menlo Park, Calif.

[73] Assignee: Metcal, Inc., Menlo Park, Calif.

[21] Appl. No.: 502,864

[22] Filed: Apr. 2, 1990

Related U.S. Application Data

[60] Division of Ser. No. 170,108, Mar. 11, 1988, Pat. No. 4,914,267, which is a continuation of Ser. No. 837,559, Mar. 3, 1986, abandoned, which is a continuation of Ser. No. 568,220, Nov. 25, 1985, abandoned, which is a continuation-in-part of Ser. No. 445,819, Dec. 1, 1982, abandoned.

[51] Int. Cl.$^5$ ............................................... H05B 6/40
[52] U.S. Cl. .............................. 219/10.53; 219/85.11; 219/10.491
[58] Field of Search ................ 219/10.53, 85.11, 85.1, 219/10.79, 10.75, 8.5, 10.491, 10.71

[56] References Cited

U.S. PATENT DOCUMENTS

| | | | |
|---|---|---|---|
| Re. 13,219 | 3/1911 | Chapman | 219/85 R |
| 1,975,436 | 10/1934 | Sorrel et al. | 219/10.41 |
| 2,393,541 | 1/1946 | Kohler | 219/10.57 |
| 2,739,829 | 3/1956 | Pedlow et al. | |
| 2,909,585 | 10/1959 | Tudbury | 219/10.71 |
| 3,109,909 | 11/1963 | McBrien | 219/10.79 |
| 3,110,793 | 11/1963 | Worthington | 219/9.5 |
| 3,218,384 | 11/1965 | Shaw | 219/504 |
| 3,243,211 | 3/1966 | Wetmore | 403/28 |
| 3,260,907 | 7/1966 | Weller et al. | 174/267 |
| 3,428,769 | 2/1969 | Ciszewski et al. | 219/9.5 |
| 3,451,609 | 6/1969 | Gillett | 174/84 R |
| 3,864,014 | 2/1975 | Lynch | 439/389 |
| 3,980,367 | 9/1976 | Laserson et al. | 439/65 |
| 4,077,692 | 3/1978 | Ellis et al. | 439/750 |
| 4,091,813 | 5/1978 | Shaw et al. | 219/233 |
| 4,151,364 | 4/1979 | Ellis | 174/84 C |
| 4,185,632 | 1/1980 | Shaw | 219/233 |
| 4,234,781 | 11/1980 | Flink | 219/10.53 |
| 4,252,397 | 2/1981 | Eigenbrode | 439/405 |
| 4,256,945 | 3/1981 | Carter et al. | 219/10.75 |
| 4,695,713 | 9/1987 | Krumme | 219/10.79 |
| 4,701,587 | 10/1987 | Carter et al. | 219/10.75 |
| 4,752,673 | 6/1988 | Krumme | 219/10.41 |
| 4,914,267 | 4/1990 | Derbyshire | 219/85.1 |

FOREIGN PATENT DOCUMENTS

| | | |
|---|---|---|
| 2723029 | 11/1978 | Fed. Rep. of Germany. |
| 2330595 | 6/1977 | France. |
| 41-1743 | 2/1966 | Japan. |
| 41-2676 | 2/1966 | Japan. |
| 41-2677 | 4/1966 | Japan. |
| 41-7257 | 4/1966 | Japan. |
| 1076772 | 7/1967 | United Kingdom. |
| WO80/02124 | 10/1980 | United Kingdom. |

OTHER PUBLICATIONS

Abstract of Soviet Union Disclosure No. 396,218, undated, p. 21 *Ferrol del Caudillo*, pp. 699 and 700, undated.
"New Method of Preventing Ice Formation on Exposed Power Conductors", Toms et al., Proc., IEEE, vol. 112, No. 11, Nov. 1965, pp. 2125-2132.

*Primary Examiner*—Philip H. Leung
*Attorney, Agent, or Firm*—Howard L. Rose

[57] ABSTRACT

A heat shrinkable sleeve or the like is heated by a ferromagnetic member which in turn is heated by a varying magnetic field, the ferromagnetic having a Curie temperature above the shrink temperature of the sleeve whereby when the sleeve is heated to its shrink temperature it tightly groups the members to be joined. Preferably a constant temperature is employed so that the ferromagnetic material will not rise above its Curie temperature.

12 Claims, 4 Drawing Sheets

TEMPERATURE SELF-REGULATING INDUCTION APPARATUS

CROSS REFERENCE TO RELATED APPLICATIONS

This application is a division of application Ser. No. 07/170,108 filed Mar. 11, 1988, now U.S. Pat. No. 4,914,267 issued Apr. 9, 1990, which was a continuation of application Ser. No. 837,559 filed Mar. 3, 1986 (now abandoned), which was a continuation of application Ser. No. 568,220 filed Nov. 25, 1985 (now abandoned), which was a continuation-in-part of application Ser. No. 445,819 filed Dec. 1, 1982 (now abandoned).

BACKGROUND OF THE INVENTION

The present invention relates to connectors containing fusible materials to assist in forming a connection and more particularly to such connectors which, during the heating of the fusible material, form part of a circuit, the temperature of which is autoregulated at about the Curie temperature of magnetic material included in the circuit at least during the heating operations.

U.S. Pat. No. 3,243,211 discloses a connector containing a fusible material so that upon insertion of an object to be joined to the connector or insertion into the connector of two members to be joined, and upon heating of the connector, the fusible material is caused to melt and contact said object or objects and upon cooling, effect a bond. The connector may also include a heat recoverable member whereby the liquified fusible material is bonded and caused to contact the object or objects while in the fluid state. This device requires an external heat source to melt the fusible material, such as hot air or an infrared radiant source.

The difficulty with the device of the patent is in the danger of overheating the objects to be soldered or otherwise bonded as well as adjacent objects. In the electronics art, for instance, overheating of delicate integrated circuits is a problem as is overheating of circuit boards, mastics, resins, heat shrinkable polymers, glues, potting compounds, all of which can be destroyed by the application of excessive heat. Further, the device has little utility for joining wires, tubes or members which are large effective heat sinks, since the large amount of heat required cannot be readily transferred through the heat shrinkable sleeve without damaging it.

SUMMARY OF THE INVENTION

In accordance with the present invention, the problems with the prior art devices are overcome by incorporating the connector containing fusible material as an integral part of an autoregulating heater, the temperature of which is maintained during melting of the fusible material at a temperature not appreciably above the melting temperature of such material. Thus, in effect, the connector operates upon itself since it becomes an active element of the circuit heating itself, the fusible material, and the elements to be connected.

The autoregulation of the connector is achieved by the inclusion in the heater of a ferromagnetic material having a Curie temperature not appreciably above the melting point of the fusible material. Since ferromagnetic materials with widely varying Curie temperatures are readily available, temperature autoregulating connector systems may be provided for a wide variety of uses including the fields of electrical power and electronics, mechanics, plumbing, etc.

The present invention makes use of the skin effect produced in ferromagnetic bodies when an alternating current is applied thereto. When such a current is applied to a ferromagnetic body, a major proportion of the current is concentrated in a region adjacent the ground return path of the current. This region is defined by the equation:

$$S.D. = 5030 \sqrt{\frac{\rho}{\mu f}}$$

cm, where S.D. is skin depth, $\rho$ is resistivity, $\mu$(mu) is a measure of the ferromagnetic properties of the material, and f is the frequency of the alternating current source. The skin depth may be controlled by controlling $\rho$, $\mu$, and f. Alloy 42 has $\rho = 70 - 80 \times 10^{-6}$ ohm cms and $\mu = 200-600$, while Low Carbon Steel has $\rho = 10 \times 10^{-6}$ ohm cms and $\mu = 1000$. Frequency may be chosen to suit the needs of the device. It should be noted that 83% of the current is concentrated in 1.8 times the skin depth, based on the fact that current falls off in accordance with $e^{-x}$, where x is the depth into the ferromagnetic layer.

The heating effect of the current flowing through the ferromagnetic material is employed in the present invention to heat a connector which connector may be the ferromagnetic member or a part of the circuit including a separate ferromagnetic member.

Autoregulation occurs as a result of the change in the value of the mu to approximately 1 when the Curie temperature is approached. In consequence, the current spreads into the body of the connector lowering the concentration of current in the thin layer of magnetic material. The skin depth changes by at least the change in the square root of mu; in Alloy 42, a change of $\sqrt{200}$ to $\sqrt{600}$ and in Low Carbon Steel, a change of $\sqrt{1000}$. Resistance to current flow reduces, and if the current is held at a constant value, the heating effect is reduced below the Curie temperature, and the cycle repeats. Thus, the system autoregulates about the Curie temperature. The performance of the aforesaid circuit is acceptable for some purposes, but the autoregulation is not rigid and large variations in temperature are produced in the presence of large thermal loads since the change in resistance is not great and results from a reduction of current concentrations only.

Excellent regulation is achieved by the apparatus of U.S. Pat. No. 4,256,945 wherein the ferromagnetic layer may be 1.8 skin depths thick and is in electrical and thermal contact with a layer of high conductivity material having a mu of one, such as copper. When the Curie temperature of the ferromagnetic material is approached, mu goes to one and $\rho$ approaches the resistivity of copper, $2 \times 10^{-6}$ ohm cms. Thus, if the ferromagnetic material is low carbon steel, mu falls from 1000 to 1 and $\rho$ falls from $10 \times 10^{-6}$ ohm cms. If Alloy 42 is employed, mu falls from 200 to 600 to 1 and $\rho$ falls from $70-80 \times 10^{-6}$ ohm cms to close to $2 \times 10^{-6}$ ohm cms. Thus the change in heating effect is marked, being about 3:1 in the case of the ferromagnetic material alone, and being as high as 160:1 in the structure of the patent.

In order to prevent damaging levels of magnetic flux or skin currents to be produced in such a device, the thickness of the copper layer should be 5 to 10 times skin depth in the copper when the heater is above the Curie temperature a set forth in copending application Ser. No. 243,777, filed Mar. 16, 1981, now U.S. Pat. No. 4,701,587, a continuation-in-part of the aforesaid U.S. Pat. No. 4,256,945.

The apparatus of the patent is operated at frequencies of 8-20 MHz to reduce the thickness of the layer of magnetic material required, but primarily to produce very large autoregulating ratios. If large autoregulating ratios are not required, the apparatus of copending application of John F. Krumme, Ser. No. 430,317, filed Sep. 30, 1982, now U.S. Pat. No. 4,695,713, may be employed to reduce the costs of the power supply. In the patent, the copper layer is replaced by a second ferromagnetic layer of high Curie point and preferably lower resistivity. Thus, when the Curie temperature of the lower Curie temperature material is reached, the current spreads into the lower resistivity ferromagnetic material where it is confined to a thin layer of the latter material. In such an arrangement, low frequencies, for instance 50 Hz, may be employed with autoregulating ratios of 4:1 being achieved with apparatus of reasonable size and with utilization of the shielding of U.S. Pat. No. 4,695,713, although such a device is considerably larger than in the patented case, U.S. Pat. No. 4,256,945.

Some of the advantages of U.S. Pat. No. 4,256,945 and U.S. Pat. No. 4,695,713 are achieved in copending application of John F. Krumme, Ser. No. 445,862, filed Dec. 1, 1981, now U.S. Pat. No. 4,752,673, wherein a thin copper layer is disposed between the two ferromagnetic layers of the first-mentioned Krumme copending application. Upon reaching Curie temperature of the lower temperature ferromagnetic material, the current spreads primarily into the copper and is confined in the second ferromagnetic layer by skin effect of a material having a mu of 1000, for instance. With little current in this second layer combined with a strong skin effect, quite thin devices producing little radiation may be fabricated while operating at low frequencies. Autoregulating ratios of 30 are achieved at about 8000 Hz.

Returning to the details of the present invention, a connector may be made of ferromagnetic material in which case a high frequency constant current a.c. is passed therethrough causing the connector to heat until its Curie temperature is reached. At such time, the effective resistance of the connector reduces and the power dissipation falls whereby by proper selection of current, frequency and resistivity and thickness of materials, the temperature is maintained at about the Curie temperature of the magnetic material of the connector In a second form of connector system, the connector may be made of a highly conductive, non-magnetic material. A crimping tool may be provided having a pair of elongated semi-cylindrical, ferromagnetic jaws having a radii of curvature in cross section approximately equal to the radius of curvature o the outer diameter of the connector. When it is desired to heat the connector, it is enclosed within the jaws, a high frequency, constant current is applied to opposite ends of the jaws, and the jaws are heated by the current which is primarily confined to the high resistivity jaws until the Curie temperature is reached. At this time, the majority of the current spreads into the high conductivity, non-magnetic material (copper, for instance) and the power dissipation in the circuit drops materially. The temperature regulation in such a device is far more rigid than in the first-mentioned device. Further, the connector, per se, is of a high conductivity material which is an important consideration in many electrical and heat conduction systems.

It should be noted that the jaws of the aforesaid tool may be configured to serve as a crimping tool where it is desired to mechanically hold a member in the connector prior to melting of the fusible material. Likewise, it is occasionally desirable that the connector heating operation occur at a later time.

The jaws may also be of copper in which event the high mu material may be the connector or pipe or other object to be joined. Short, axially spaced copper jaws may also be employed to apply current to opposite ends of the autoregulating circuit and may or may not be constructed to crimp one or more ends of the connector. The magnetic jaws may also be employed as crimping tools in addition to use as part of the heating circuit.

The connector may also be a laminated structure of high mu material and copper such as set forth in U.S. Pat. No. 4,256,945. The connectors may also be fabricated from the laminated structures of U.S. Pat. No. 4,752,673, assigned to the same assignee as the present invention.

The laminar ferromagnetic-non-magnetic heater construction may be achieved by inserting a copper wire, tube, rod or other metallic element in a ferromagnetic sleeve of close diameter s that relatively good contact is maintained between the wire and the sleeve. Tinning of the wires, tubes or the interior of the connectors is also appropriate. Current at proper frequency applied to opposite ends of the sleeve flows through the sleeve due to skin effect until the Curie temperature is reached at which time the current flows primarily through the copper wire. The fusible material already in situ or applied adjacent the connector or through holes in the connector flows in the spaces between the wire and sleeve and soldering is completed.

The connector may be the combination of one or both of the aligning pins and receptors of a multi-pin connector. The connector may include a copper sleeve with axially-spaced rings of high mu materials of different Curie temperatures so as to produce different temperatures displaced in time and space whereby, for instance, to heat shrink a first material to confine flow of solder and then melt the solder, etc.

The connectors may have teeth or projections to help hold the objects to be joined or to pierce insulation so that the object may become part of or be used to apply current to the connector. Holes may be employed so that a hollow object to be connected may be joined both internally and externally.

The connectors, when used as pins in a junction block, may be connected for individual or gang heating so that a single pin or all pins may be disconnected. The devices may also be formed into the edge connectors of printed circuit boards to produce strong mechanical connections.

The fusible material may be any number of meltable materials such as solders for electrical, mechanical or plumbing applications; brazing materials, heat curable potting compounds, heat flowable plastics for joining plastic members, meltable adhesive or glue, mastics, crystalline organic polymers, mixtures of crystalline and/or partially crystalline organic polymers, and the like. The fusible material is incorporated in or located adjacent to the connector, and upon heating, flows around or within a member or members to be bonded to the connector, to each other, or to both. Numerous methods may be employed to produce the flow; as in Wetmore, one may use a heat shrinkable material. A foaming material may be used and in appropriate circumstances, gravity or the force of insertion of the member to be connected, may be employed. Capillary action and suitably located holes may also be employed in appropriate circumstances as well as wetting action of the molten material on certain other materials which may form the connector or the objects to be connected.

Several fusible materials may be incorporated in the same connector. A fusible material such as a polymer or resin can be used to seal or environmentally protect the connector. The same or another fusible may be used to contain or direct the flow of solders. A heat shrinkable material activated by the heating action of the connector can shrink to enclose the connector area. Likewise, a heat shrinkable material may also be used as a dam, after shrinking, to confine the molten material to appropriate regions. The molten material, if conductive, may also be used to permanently disconnect the heater from its electrical source, or to create an alternate circuit bypassing the heater. Thus, when the molten material has migrated about or to the members to be connected, soldered, the molten material, which in its initial position formed part of the electrical circuit, breaks the circuit. Thus, the autoregulating heater initially prevents overheating and the solder may, by flow through passages, holes or otherwise, disconnect the circuit when the operation has been completed. In this way, a "one time" heating operation may be achieved.

Another variation of this latter feature permits the use of the connector as a resistance heater since the solder or other conductive, meltable material breaks the circuit when the parts to be joined are, in fact, wetted by the bonding conductor and drawn to a new location.

Likewise the flow of a conductive fusible may be used to connect current to another portion or section of the connector area, whereby it activates another heater part. The second heater may usefully be of a different temperature Curie Point material and in the on instance, the material may be a fusible plastic, and in the other, a fusible conductor such as solder.

It is an object of the present invention to provide connectors which contain or have associated with them, a fusible material and are adapted to be incorporated in an electric circuit as a part thereof whereby when the circuit is completed, the connector is heated and the fusible material becomes molten and flows to effect a bond between the connector and object or two objects inserted in the connector or between the objects and the connector whereby in effect, the connector is a part of the tool or apparatus achieving the desired connection.

It is another object of the present invention to provide a connector which is an autoregulating heater whereby heat does not have to be transferred through surrounding layers of plastics, insulations, etc., and as a result, uniform heating of large, as well as small objects to exact temperatures may be achieved at rapid rates relative to the size of the objects to be joined.

It is yet another object of the invention to provide autoregulated heat to a connector and meltable fusible by means of an inductive current source. That is, a.c. current in a primary winding induces current and thereby $I^2R$ heat in the connector and fusible material. The connector serves as a secondary inductor which is preferably tightly coupled to the primary winding, e.g. with substantially one-to-one coupling. With an inductive source, autoregulated heating to melt a fusible can be effected in environments where a connector and fusible are not accessible to a power source connected directly thereto. Hence, many geometries and uses of connectors according to the invention are realizable.

Also, with an inductive source, heating may be rendered particularly responsive to certain frequency bands of current and heating for plural connectors—either simultaneously or sequentially—may be facilitated.

DESCRIPTION OF THE PREFERRED EMBODIMENTS

Figure 1:
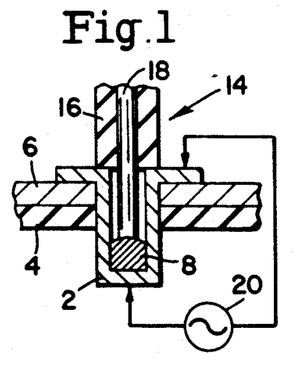
FIG. 1 is a cross-sectional view of a connector of the present invention for use with a circuit board.
Figure 2:
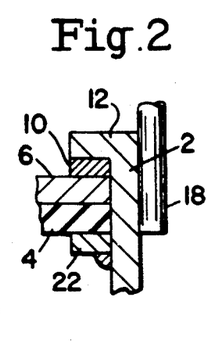
FIG. 2 is an enlarged view of a part of the connector and circuit board of FIG. 1.

Referring now specifically to FIG. 1 of the accompanying drawings, there is illustrated an example of a heater-connector. A cup 2 of ferromagnetic material is inserted into a circuit board 4 in contact with a conductor 6 formed on the upper surface of the board 4, as illustrated in FIG. 1. The cup 2 has a body of solder 8 lying at the bottom of the cup and as illustrated in the detail of FIG. 2, a thin layer of solder 10 may be provided underlying lip 12 of the cup in alignment with the conductor 6.

The cup 2 is fabricated from a ferromagnetic material preferably of carbon steel with a resistivity of $10 \times 10^{-6}$ ohm cms and a mu of about 1000. Other ferromagnetic materials are available, but this material is of low resistivity, readily worked and inexpensive.

In order to connect an external wire to the circuit, such as wire 14, a portion of insulation 16 near one end of the wire is removed exposing the copper conductor 18. The exposed region of conductor 1 is inserted into and in contact with the cup and brought into contact with the solder 8. A high frequency source 20 of constant current is connected between the lip 12 and the bottom of the cup 2 and heating is started. The solder melts and the temperature of the cup is held slightly above the melting temperature of the solder, at about the Curie temperature of the material of the cup 2. The wire is pushed down into the molten solder causing the solder to flow upward between the wire and the cup and then the heating current is removed. It should be noted that the solder 10 is also rendered molten and causes the cup to be soldered to the board 4. A force fit of the cup into the board may also be relied upon to hold the cup 2 against the conductor 6 or alternatively, the cup may be soldered to a metal ring 22 at the bottom of the board, all in the same operation.

The device of FIG. 1 is useful in circuits where delicate integrated circuit components have not as yet been attached to the circuit board, and in those uses not involving delicate electronic components or not involving electronic components at all. The concepts of FIG. 1, for instance, may be employed to connect two pipes with a sleeve of ferromagnetic material having solder or a high temperature fusible material contained therein such as illustrated in FIG. 3 of the accompanying drawings.

Figure 3:
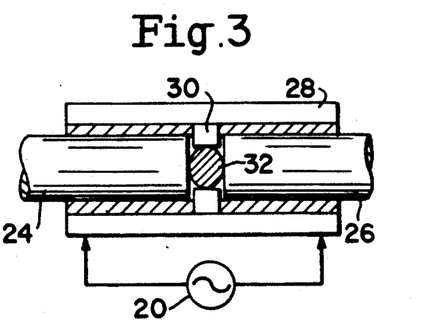
FIG. 3 is a cross-sectional view of a connector for joining two wires end to end.

Referring specifically to FIG. 3, there is illustrated the ends of two pipes that ar to be joined together. Pipes 24 and 26 are inserted into opposite ends of a sleeve 28 of ferromagnetic material. The ends of the pipes 24 and 26 are held slightly apart by a circumferential internal shoulder 30 having a quantity of high strength fusible material 32 positioned in transverse alignment with the shoulder 30.

Source 20 is connected to the opposite axial ends of sleeve 28 causing it to heat quickly to its Curie temperature which again is slightly above the melting temperature of the fusible material 32. The molten material flows between the pipes 24 and 2 and the sleeve 28 so that when cooled, the pipes 24 and 26 are joined to the sleeve 28. Due to the autoregulating effect of the heater circuit, no more energy than is required to achieve the junction is expended, and since the entire sleeve 28 is the heater, cold spots do not develop which impair the integrity of the junction.

Figure 4:
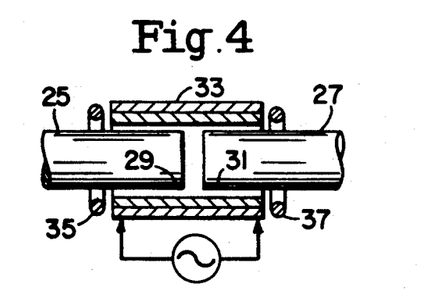
FIG. 4 is a variant of the connector of FIG. 3.

Referring now particularly to FIG. 4 of the accompanying drawings, a modification of FIG. 3 is illustrated for use with hollow pipes. In this instance, pipes 25 and 27 are tinned at locations 29 and 31, respectively, i.e., from a region external to connector 33 to their abutting ends within the connector. No solder is disposed within the connector, but is disposed in the form of rings 35 and 37 around the pipe and over the tinned areas extending outwardly from the connector 33.

Upon operation to achieve connection, the solder rings 35 and 37 are heated to melting point and immediately flow into the space between pipes 25 and 27 and connector 33 so that upon cooling, the connection is completed.

Figure 5:
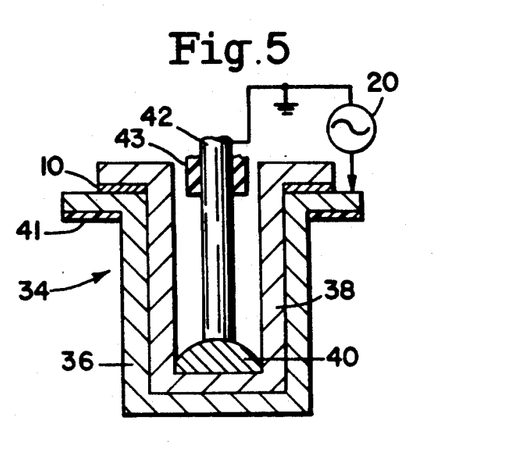
FIG. 5 is a cross-sectional view of a connector arrangement in which the wire to be connected forms part of the connector circuit.

Returning to the situation illustrated in FIG. 1, if circuit components are attached to the board prior to activation of the heater and magnetic fields or currents circulate on the surface of the cup to the detriment of the circuit components, the cup of FIG. 5 may be employed. Cup 34 consists of an outer lamina 36 of copper or other highly conductive material and an inner lamina 38 of ferromagnetic material. A blob of solder 40 is dispensed in the bottom of the cup.

In this instance, wire 42 to be connected to the cup, becomes a part of the heater circuit forming a grounded return path for the current from source 20; the source being connected to the wire and the cup adjacent the top of the cup as illustrated in FIG. 5. As described relative to FIG. 2 of the accompanying drawings, the solder 10 of FIG. 2 and FIG. 5 is also heated and the copper layer 36 of the connector is soldered to a circuit board conductor 6.

Upon energization of source 20, current flows primarily along the inner surface of the lamina 38 with approximately 63.2% flowing in a skin depth. At 10 MHz, with a material having a mu of 1000 and a resistivity of $10 \times 10^{-6}$ ohm cm, the skin depth is approximately 0.0001 inch. For maximum efficiency of the heating, i.e., autoregulating ratio, it is found that the lamina 38 should be approximately 1.5 to 1.8 times skin depth, and thus a quite thin film of high mu material is all that is required on the copper. The thick film of the material 38 subsisting between the wire 42 and copper layer 36 introduces little resistance into the circuit.

Figure 6:
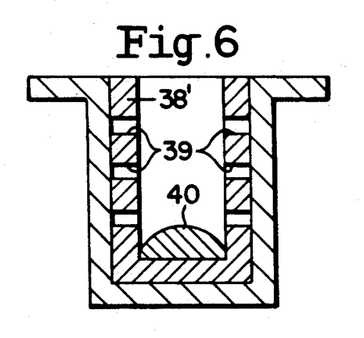
FIG. 6 is a cross-sectional view of a modification of the connector of FIG. 5.

Even this small effect may be virtually eliminated by forming the cup 38 with small radial passages such as illustrated in FIG. 6 as cup 38'. In this instance, the solder flows through openings or passages 39 to provide a highly conductive bridge from the wires to the copper layer 36.

In order to prevent short circuiting of the circuit of FIG. 5 by the base wire 42 touching the inner cup 38, the inner diameter of cup 38 may be made large enough to accept the wire with its insulation 43. Preferably a thin layer of insulation 41 may be applied to the cup 38 at its upper end as viewed in FIG. 5.

In order to prevent material radiation of the magnetic field from the cup region, the thickness of the copper layer 36 should be 5 to 10 skin depths of the copper at the operating frequency. If the frequency is 8 MHz, the skin depth is 0.001"; the mu of copper being one and its resistivity being $2 \times 10^{-6}$ ohm cms. At 10 skin depths, the copper thickness required for substantially complete shielding is 0.01 inch.

Referring to FIGS. 7-10 of the accompanying drawings, there is illustrated another embodiment of the present invention. A sleeve 44 of copper or like material having a closed end is provided with a quantity of solder 46 adjacent its closed end. A tool 48, see FIG. 8, may be employed to crimp and apply high frequency constant current to the circuit; jaws 49 and 50 in a first embodiment being made of high mu material and forming part of the autoregulating circuit. In detail, the tool 48 is similar to a pair of pliers having crossed arms 52 and 54 connected at one end to jaws 49 and 50, respectively. The arms 52 and 54 are pivoted to one another about pivot pin 56.

Figure 9:
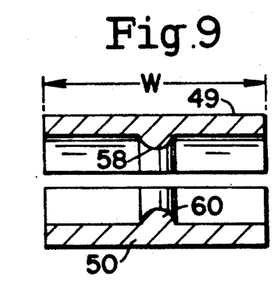
FIG. 9 is a cross-sectional view of the jaws of the tool of FIG. 8, illustrating the crimping ridges in the jaws.

The jaws 49 and 50 are semi-cylindrical members and may have inwardly directed protrusions 58 and 60, respectively, see FIG. 9, which are applied in radial alignment with teeth formed on the inner surface of connector 44. Current from source, such as source 20 illustrated in FIG. 1, is connected via leads 62 and 64 to opposite ends of jaw 49 and 50, respectively.

Figure 7:
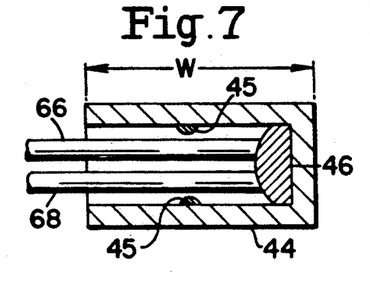
FIG. 7 is a cross-sectional view of a connector for joining two wires, side by side.

In operation, a wire or wires, such as wires 66 and 68 are inserted in sleeve 44, the jaws 49 and 50 are disposed about the sleeve at teeth 45 and are squeezed together to press the teeth or deform the sleeve into contact with the leads 66 and 68 to physically hold them in place. The jaws contact the sleeve 44 preferably along the length of the sleeve or the jaws, whichever is longer so as to form a laminated structure.

Figure 10:
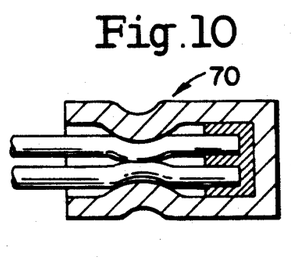
FIG. 10 is a cross-sectional view illustrating the final connection produced by the connector and apparatus of FIGS. 7-9.

When the current from a source such as source 20 is applied, the jaws 49 and 50 are heated quickly to the Curie temperature of the material of the jaws, at which temperature the system is maintained by the above-described autoregulating effect. The heat of the jaws is readily transmitted to the copper sleeve causing the solder 46 to melt and flow about the wires 66 and 68 to produce the desired soldering effect. The final connection is illustrated in FIG. 10. It will be noted that the crimping produced by the tool 48 produces a dam for the solder at location 70, although this occurs only when the outer diameter of the sleeve 44 and the inner diameter of the jaws are approximately equal. Interchangeable jaws may be provided or a dam for the solder may be provided by a heat shrinkable insert or a fusible insert in the sleeve 44 as is discussed subsequently relative to FIG. 21. Also, the tool may be made adjustable by several means so as to accommodate many different size tubes; the combination with interchangeable jaws of different sizes and material permitting a single tool to accommodate many different sizes and types of connectors.

Figure 11:
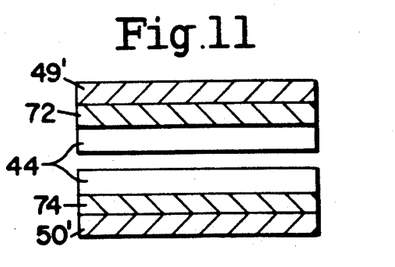
FIG. 11 is a cross-sectional view illustrating a modification of the jaws of FIG. 9.

Referring now to FIG. 11 of the accompanying drawings, there is illustrated a modification of the jaws 49 and 50 for use in situations where the sleeve 44 is to be used in a non-electrical system and may or may not be a good conductor. The sleeve 44 may be magnetic or non-magnetic; jaws as modified in FIG. 11, being applicable to either case. Referring to FIG. 11, jaws 49' and 50' are provided with inner linings of copper 72 and 74 or like material.

Operation is the same as in the embodiment of FIGS. 7-10, except that the function of the sleeve 44 of such embodiment is assumed by the layers 72 and 74, and heat is transferred to the structure to be heated via the copper layers. If the material is non-magnetic, the function of the apparatus is basically a discussed in U.S. Pat. No. 4,256,945. If the member to be heated is magnetic, the operation is as discussed in U.S. Pat. No. 4,695,713.

Specifically, the Curie temperature of the ferromagnetic jaws 49' and 50' is less than the Curie temperature of the magnetic material to be heated. Thus, when the Curie temperature of the jaws is reached, the current spreads into the copper and into the member being heated. Since the Curie temperature of the latter member has not been reached, the current therein is, due to skin effect, confined primarily to a thin layer of the material to be heated adjacent the copper thus maintaining the radiation and current on the inner surface of the material to be heated at quite low levels.

Figure 8:
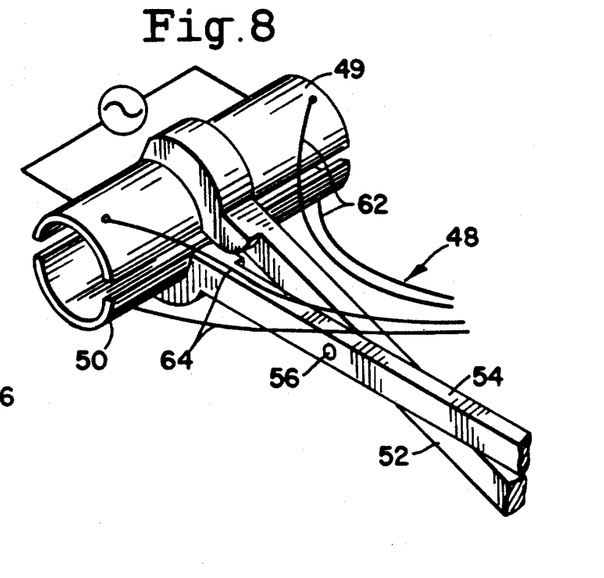
FIG. 8 is a view in perspective of a tool including jaws which, together with the connector of FIG. 7, completes the circuit for heating the said connector.

It should also be noted that if the member to be heated is a magnetic material, then the jaws of FIG. 8 with or without the projections 58 and 60 may be employed; the operation of such a device being as described in U.S. Pat. No. 4,695,713. Operation as in U.S. Pat. No. 4,256,945 may be achieved if the jaws are copper alone and the connector is ferromagnetic.

In the various embodiments described hereinabove, the solder or other fusible material has been described as a mass located at the end of a connector cup. In open-ended connectors and also in connector having a closed end, the solder may be formed as a layer on the inside of the connector whereby distribution of the solder is not necessary during the connection. Also, in FIG. 5, the wire may be tinned to provide the solder; the wire being snugly received in the sleeve on cup 38. The same type of arrangement may be employed in FIG. 3 with the shoulder 30 providing a sealing surface as in plumbing fittings.

Figure 12:
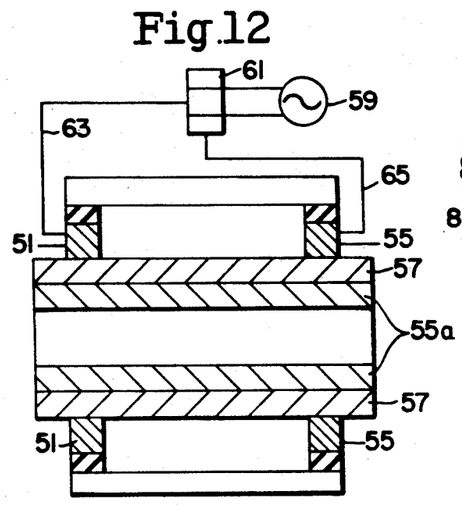
FIG. 12 illustrates another type of jaw of the present invention.

Referring now specifically to FIG. 12 of the accompanying drawings, there is illustrated a variation of the jaws of the prior figures. In this instance, a pair of jaws axially spaced apart are provided. Specifically, a pair of jaws 51 are disposed adjacent one end of a connector 53 and a second pair of jaws 55 are disposed at the other end of a connector. The jaws of a pair are electrically connected together either by wiring between them or contact in use.

In this arrangement, the jaws, which may or may not crimp the ends of the connector, are brought into contact with an outer magnetic layer 57 of the connector, which layer may be disposed about a copper or like, or second magnetic layer 55a to produce heating.

In order to provide appropriate impedance matching at higher frequencies, if used, a source 59 is connected to a coaxial cable terminated remote from the source in a suitable termination 61. Beyond the termination 61, the leads to the connector or jaws, leads 63 and 65, in this case, should be as short as convenient so as to minimize impedance mismatch. These statements apply to all forms of the invention illustrated in this application.

Referring again to FIG. 12, copper jaws of the type illustrated in FIG. 8 may be also employed with connectors which may be two-layered o three-layered wherein the connector comprises a magnetic layer or two magnetic layers or a magnetic layer with another magnetic layer or the jaws.

The present invention may be employed in conjunction with a heat shrinkable plastic wherein when the soldering temperature is achieved the plastic shrinks and seals the finished connection against moisture. Such a connector is illustrated in FIG. 13 of the accompanying drawings and reference is made thereto.

Figure 13:
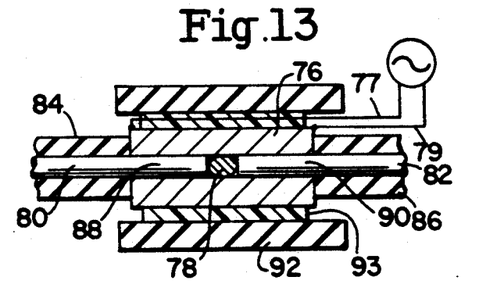
FIG. 13 is a cross-sectional view of a connector incorporating a heat shrinkable outer covering.

In FIG. 13, a cylindrical connector 76 of ferromagnetic material has a body of solder 78 located in its longitudinal center. Wires 80 and 82 have their insulations 84 and 86, respectively, stripped to provide bare wires 88 and 90 inserted into connector 76 and abutting the solder 70 in the center. The connector and adjacent portions of the insulated wires are loosely covered by a heat shrinkable plastic sleeve 92.

When heat is applied, the solder melts, the plastic shrinks and seals against the wires 80 and 82 and make a sealed, soldered connection. Sealant 93 may be applied between the sleeve 92 and the connector so that when the sleeve shrinks, a moisture-proof seal is provided.

Current is applied via wires 77 and 79 which heat the sleeve and the heat shrinkable material. These wires are quite thin and may be left in tact o cut off at the end of tube 92 after completion of the connection. In such a case, the current in the connector is confined to the outer diameter of the sleeve 76, heating the plastic 92 and the solder 70 via the bare wires 88 and 90 and sleeve 76. At about the Curie temperature, the current spreads into the copper wires 80 and 90 and the rate of heat generation falls providing autoregulation. Conventional circuitry may be employed by connection to the ends of wires 80 and 82 remote from the connector.

It should be noted that the heat shrinkable sleeve 92 may be replaced by an elastomeric sleeve which may be slipped over one of the wires before joining of the wires and then moved over the connector and adjacent regions of the wire after connection is completed. Sealant may be inserted between the sleeve to insure moisture resistance.

If the sleeve 76 is formed as metallized coating on the inner surface of the plastic, then both physical and electrical connection is achieved by the plastic as well as the solder. At frequencies of 8 MHz and the proper material, as indicated previously, the sleeve 76 need be only 0.000012 inch thick at 1.8 times skin depth. The autoregulation ratio approaches 160 and thus the danger of overheating the plastic or insulation of the leads 81 and 82 is rendered remote. The same basic effect may be achieved with a free standing sleeve 76 sufficiently thin to be crushed by the heat shrinkable plastic which shrinks after the solder is molten.

The ferromagnetic layer associated with the heat shrinkable material may be formed of particulated magnetic material imbedded in the body of or on the surface of the sleeve, the density of the material being sufficient to provide a conductive path. Alternatively, the sleeve may be conductive.

The heat shrink feature may be employed to distribute the solder. In the above case, shrinkage of the sleeve 76 with the plastic squeeze the solder into all areas of the junction and insures good bonding of the wires and the sleeve.

Figure 14:
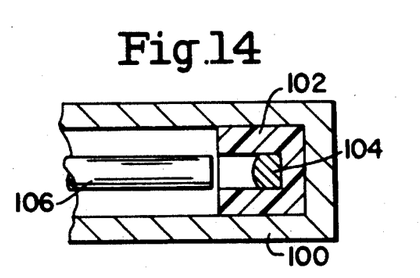
FIG. 14 is a cross-sectional view illustrating the use of a heat shrinkable material for distributing the liquid fusible material.

In this context, reference is made to FIG. 14 of the accompanying drawings for another embodiment utilizing heat shrinkable material to distribute solder.

An outer cup or shell 100, which may actually be any one of the forms of connectors except FIG. 1 when the sleeve is an inner coating on the plastic, has located adjacent the closed end, as illustrated, a cup 102 of heat shrinkable plastic. The plastic cup 102 contains a quantity of solder 104; the melting temperature and shrink temperature of the two being about equal. When the device is heated, the cup 102 shrinks, expelling the solder and forcing it to flow about wire 106.

As a result of the autoregulation produced by the cup 100, the plastic is not heated appreciably above shrink temperature and is not damaged.

Figure 15:
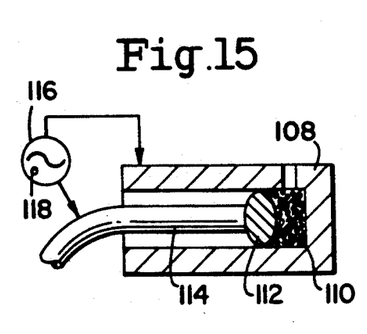
FIG. 15 is a cross-sectional view illustrating the use of a foaming agent to dispense the liquified material.

Another method of distributing solder is disclosed in FIG. 15 wherein a connector 108, in accordance with the present invention, has disposed adjacent a closed end, a body 110 of heat foamable material covered by a body 112 of solder. The foamable material should become active at about the melting temperature of solder. Upon heating, the material 110 expands to many times its original volume and forces the molten solder about wire 114 to complete the soldering operation.

The connector of FIG. 15 may be readily modified to terminate the supply of electricity to the autoregulating heater upon melting of the solder. If a source 116 is connected across the wire 114 and connector 108, upon melting of the solder 112 and expansion of the foam 110, the solder, if volumes of the various parts are properly chosen, is forced up to the open end of the cup 108. The supply 116 is short-circuited. The supply 116 is provided with a sensitive circuit breaker schematically illustrated at 118, so that when the solder has progressed toward the open end of cup 108 to cause the breaker to trip, the circuit is disconnected, but at all times, before tripping of the breaker, the temperature is controlled.

In addition to the use of heat shrinkable or foaming materials to control flow of the fusible material, a spring or spring biased piston may also be employed.

Figure 16:
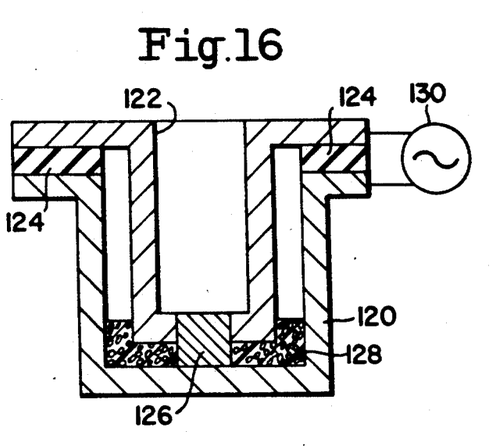
FIG. 16 is a cross-sectional view illustrating the use of a double walled connector which disconnects the connector from its associated energizing circuit upon flow of the fusible material.

The connector arrangement of FIG. 16 provides a true circuit break in the connector preventing further heating thereof. The connector comprises an outer cup 120 and inner cup 122 spaced apart and insulated from one another by insulating spacers 124. The inner cup 122 has a hole in its bottom, as illustrated in FIG. 16, and solder 126 extends through the hole in cup 122 into contact with cup 120 The space between the two cups is filled, or at least partially filled, with heat foamable material 128. A source 130 of alternating current is connected across cups 120 and 122, either or both of which may be ferromagnetic or laminates of ferromagnetic and conductive materials.

Upon heating, the solder melts and is forced up into cup 122 by the foam, thus breaking the connection between the cups and permanently opening the circuit. Until the circuit is opened, autoregulation prevents overheating. The outer cup 120 may be discarded or reused after the operation is completed.

Figure 17:
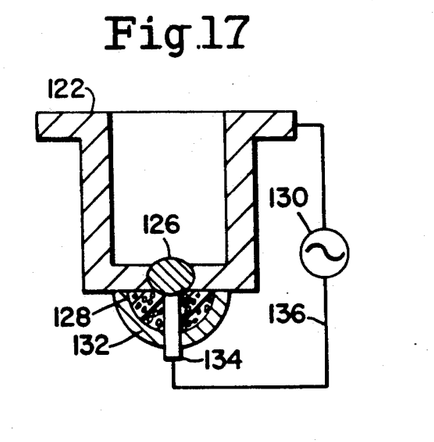
FIGS. 17-19 illustrate modifications of the connector and associated circuit elements of FIG. 16.

A similar effect is achieved with the structure of FIG. 17 wherein only the inner cup 122 of FIG. 16 is employed. One end of the leads from the source 130 is fitted with a hollow dome-shaped member 132 formed of a resilient non-conductive material. A metal contact 134 extends through the cup and is connected to a lead 136 from source 130. The dome-shaped member is filled with heat foamable material. When the device is to be operated, the member 132 is pressed against the bottom, as viewed in FIG. 17, of the autoregulating connector to bring the contact 134 into contact with the solder 126. Upon heating, the solder is forced up into cup 122 by the foam 128, breaking the circuit. The bottom of the cup 122 may be covered with insulating material except at the solder head 126 to prevent application of the contact 13 with the cup per se.

In both of the embodiments of FIGS. 16 and 17, the cup 122 may be lined with wicking material to eliminate the need for the foaming material.

Figure 19:
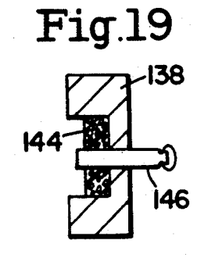

The jaw assembly of FIG. 9 may be modified to operate with the connector of FIG. 17. The cup 122 is copper and jaws 49 and 50 are ferromagnetic or vice versa. Hinged to the bottom of jaw 50 is a recessed nonconductive plate 138 illustrated separately in FIG. 19.

Figure 18:
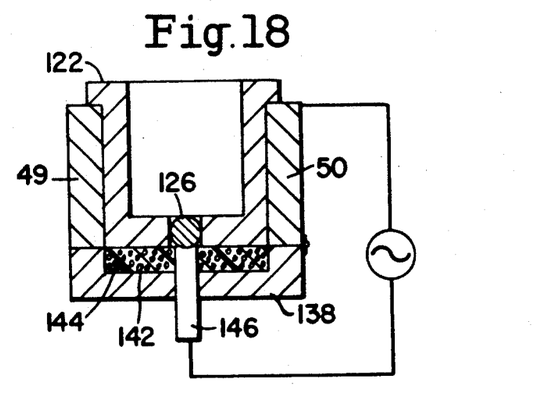

The cup 122, which may be of copper or like conductive material, is located in the hollow cylinder defined by the jaws 49 and 50. A charge 142 of foaming agent is positioned in recess 144 in plate 138; the charge having a center hole through which a conductive stud 146 protrudes. The plate 138 is hinged to jaw 50, and when it is wished to activate the system, the plate 138 is swung into the position illustrated in FIG. 18 with stud 146 in contact with the body 126 of solder. Thereafter operation is the same as with the apparatus illustrated in FIG. 17.

Figure 20:
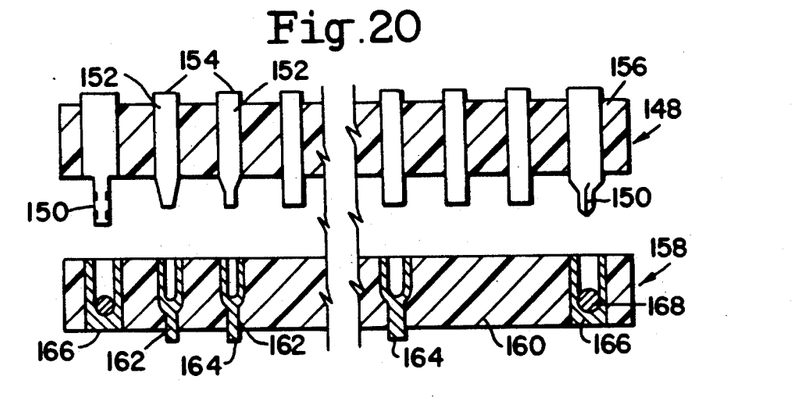
FIG. 20 illustrates the us of the present invention to permanently join the male and female parts of a multi-pin connector or junction.

The connectors of the present invention are useful for many purposes, and as indicated above, may be used strictly for mechanical connections. Such a use is illustrated in FIG. 20 of the accompanying drawings. In this embodiment, the female receptacle for the locating pins of a multiple contact connector are connectors of the present invention whereby, if desired, the male and female parts of a connector may be soldered to one another to produce a bond which is broken only by the subsequent application of heat. Such a connector has high vibration resistance and does not require an additional locking or immobilization device.

Referring specifically to FIG. 20 of the accompanying drawings, a male connector 148 is provided with locating pins 150 and pins 152 for connection to leads 154. The pins 152 and locating pins 150 are usually molded in a block of plastic 156, the pins 152 extending through the block for insertion in female receptacle 158 in a mating connector block 160. The pins 150 extend through the block 156 toward the block 160, as viewed in FIG. 20. The part of the pins 150 extending toward block 160 may take many useful forms.

The block 160 of the female connector has a plurality of female receptacles 162 molded therein, the pins providing extensions 164 extending out of the bottom of the block for connection of leads thereto. The block 160 is also provided with female receptacles 166 for receiving pins 150. Solder 168 is illustrated as disposed in the bottom of the receptacles 166, but they may be lined with solder instead.

The pins 150 and receptacles 166 may constitute an autoregulating heater or the receptacle alone may be the heater. In either event, after the members 141 and 158 have been mated, if it is desired to semi-permanently join them, an a.c. source is applied across pins 150 and 166, the solder melts and bonds the pins 150 and receptacles 166. If, at a later date the blocks 156 and 160 are to be separated, the a.c. source is again connected across the connector circuit, the solder liquified and the blocks separated. There are other possible circuit connection schemes which may be utilized to activate the heating operation.

Figure 21:
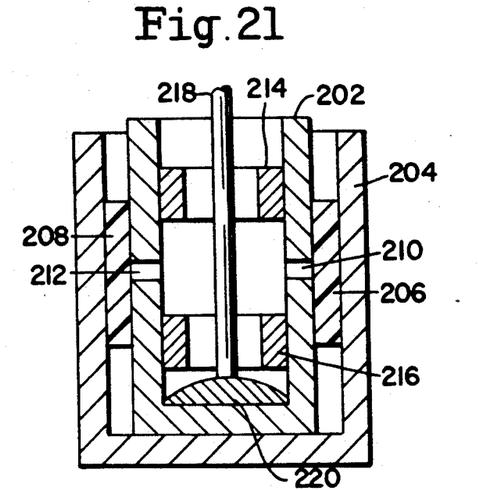
FIG. 21 is a cross-sectional view of a connector having two different temperature zones for soldering and potting.

A form of multi-temperature device is illustrated in FIG. 21 of the accompanying drawings wherein two different heat zones are provided to perform different functions; in the illustrated example, soldering and potting.

A cup 202 of copper has a sleeve 204 of heat shrinkable material disposed about it with layer 206 of material A of a potting compound located between the sleeve and cup in one location and layer 208 of potting material B located in another region between the cup and sleeve.

Holes 210 and 212 extend through cup 202 in communication with material 206 and 208, respectively. The cup 202 has two rings 214 and 216 of high mu material disposed on its interior surface and axially spaced from one another. The material 216 has the lower Curie temperature and thus autoregulates at a lower temperature than the ring 214.

In practice, a wire 218 is inserted in the cup 202 and extends into contact with a body 220 of solder located in the bottom of the cup. At the ring 214 and 216, the current passes into the rings and is concentrated o the inner surfaces thereof adjacent the wire 218, the ground return path. Thus, the rings are heated and the heat is transferred to the copper cup. The ring 216 autoregulates at about the melting point of the solder and the solder melts. At some later time, the ring 214 reaches its highest autoregulation temperature which is at about the melting point of the materials 206 and 208 or the temperature of the higher melting point o the two.

The temperatures are also chosen such that the sleeve 204 shrinks at this point or preferably somewhat below the melting point of materials 206 and 208.

Upon melting of materials 206 and 208, they are forced through discreet holes 210 and 212 into the interior of the cup 202 where they mix and are heat cured into a solid mass. The solder, when cooled, completes the mechanical as well as electrical connection to the cup.

Figure 22:
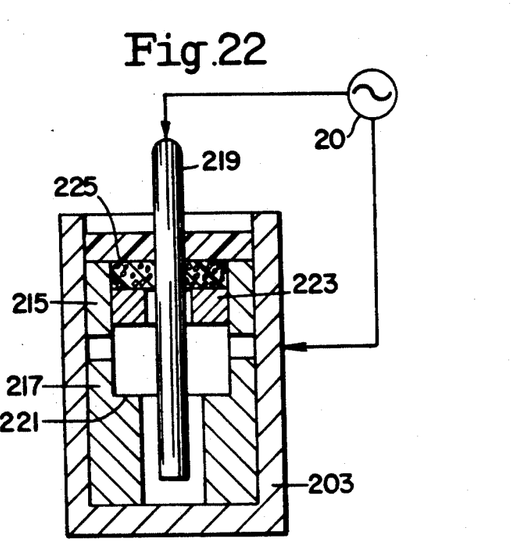
FIG. 22 is a cross-sectional view of a heater, when, upon fusion of a conductive material, breaks a circuit and makes another circuit.

Referring now to FIG. 22 of the accompanying drawings, there is illustrated an arrangement similar to that of FIG. 21 but in which the annuli 214 and 216 of FIG. 21 are connected to the current source at different times.

A cup 203 of conductive material such as copper is provided with ferromagnetic bands 215 and 217 formed at axially spaced locations on the inner surface of the cup. The band 217 is stepped inward at 221 so that the spacing between the lower end of band 217 and a conductor 219, when inserted, is less than the spacing at the upper end of the band as viewed in FIG. 22. A spider 223 of solder extends inwardly from the upper end of band 215 into contact with the wire 219 and heat fusible insulating material 225 is disposed between the wire 219 and the band 215 above the spider 223.

Upon application of current from a source 20, the current flows through the wire 219, solder 223 and in the band 215 until the Curie temperature is reached. In the meantime, the heat curable plastic is cured, and then the solder 223 melts and runs down the heated wire and into contact with the band 217 below the shoulder 221. A foamable material may be employed to produce transport of the solder to the stepped region as opposed to gravity as illustrated in FIG. 22.

Upon movement of the solder, the circuit between wire 219 and band 215 is broken, and a new circuit is established between wire 219 and band 217 causing heating of the band 217 to insure that the solder connection is good.

Figure 23:
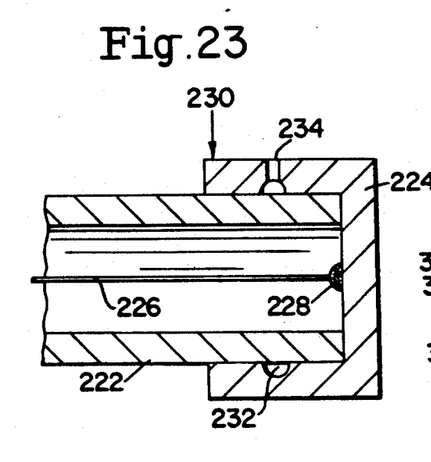
FIG. 23 is a cross-sectional view of a heater-connector for fitting an end cap on a ferromagnetic pipe.

The use of the wire in FIG. 21 as a ground return, also finds utility in an arrangement such as illustrated in FIG. 23. A pipe or other hollow object 222 of magnetic material is to be fitted with an end cap 224. The end cap may be copper or other conductive material or another magnetic material more conductive than the material of pipe 222 and of higher Curie temperature. In the latter case, a layer of copper may be interposed between members 222 and 224 as in prior connectors.

A wire 226 is secured to the interior of cap 224 at location 228 and brought out through pipe 222. If now a source is connected across wire 226 and point 230 on the cap 224, currents are confined to the interior of pipe 222. Solder of other material may be applied to the junction of cap 224 and pipe 222 or may be fed to a circumferential interior groove 232 in cap 224 through a radial hole 234 through the cap.

Figure 24:
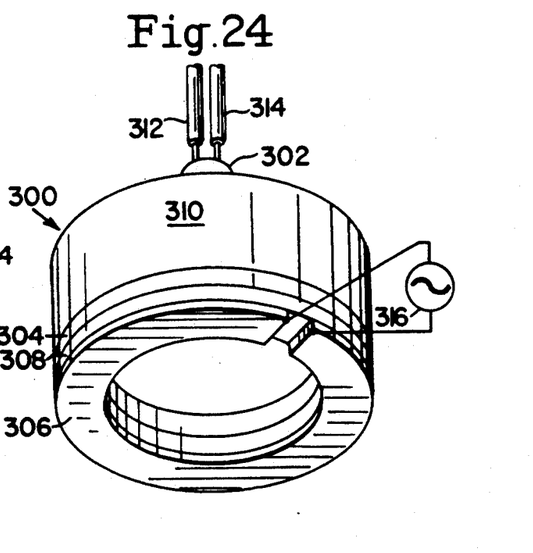
FIG. 24 is an illustration of a first specific inductive embodiment of the invention, showing a large coil structure.

Referring to FIG. 24, a specific embodiment of the invention is illustrated with an inductive source of current. The basic principles of the invention—pertaining to autoregulation and the like—are applicable regardless of the form of the source. By using the inductive source, however, the invention can be employed in geometries and applications to which connective embodiments having a source connected directly to a connector device are not readily applicable. In this regard, it is noted, that the sources shown in various embodiments previously disclosed herein may comprise either connective or inductive sources.

In FIG. 24, a multi-layer structure 300 is shown—the structure being employed to provide controlled heating to a fusible material 302 (partly in dashed line representation). Specifically, the structure 300 includes a first layer 304 of material characterized by a large drop in magnetic permeability, $\mu$, in response to an increase in temperature to or near the Curie temperature thereof; a second layer 306; a third insulative layer 308 between layers 304 and 306; and a fourth layer 310 in contact with the first layer 304, the first layer 304 lying between the third layer 308 and the fourth layer 310. As shown, each of the layers 304 through 310 are annular in structure—layer 306 having a split therein—and are coaxial. Layers 304 and 310, it is noted, are preferably but not necessarily annular in shape. At low temperatures, i.e. below the Curie point, the permeability $\mu$ of the magnetic layer 304 is high—on the order of 20 to 1000, for example, as discussed previously. The flux generated by current flowing through the split loop layer 306 is thus concentrated in the magnetic layer 304. The magnetic layer 304 has preferably a high resistivity $\rho$ and is thermally conductive. Layer 310 is also thermally, as well as electrically, conductive.

As seen in FIG. 24 the fusible 302 rests atop the layer 310, with two wires 312 and 314 that are to be soldered or otherwise fused together sitting atop the fusible 302.

An a.c. source 316 provides a substantially constant current input to the split loop layer 306.

In operation, the split loop layer 306 serves as a primary winding which, in response to the alternating current flowing therethrough, generates a magnetic flux. At low temperatures, the magnetic layer 304 has a high permeability $\mu$ so that the generated flux is substantially confined to the layer 304, which acts as a closely coupled secondary winding. Having high resistivity, the layer 304 generates I²R heat which is transferred through the thermally conductive magnetic layer 304 and the layer 310 to the fusible 302. In accordance with the invention, the current induced in the secondary winding (i.e. layer 304) is confined to a limited depth described by the above skin depth principle. That is, the current induced in layer 304 will be largely confined to a depth proportional to $$\sqrt{\frac{\rho}{\mu f}}$$

where f is the frequency of the induced current, and $\rho$ is the resistivity and $\mu$ the permeability of layer 304. When $\mu$ is high, the induced current is largely confined to a relatively thin skin depth and hence considerable heat is produced in the layer 304. The heat is transferred through the layer 310 to melt the fusible 302 and effectuate connection between the two wires 312 and 314.

As heat is generated in the layer 304, however, the temperature thereof increases toward the Curie temperature. At or near the Curie temperature, the permeability $\mu$ drops to or toward one. The skin depth increases greatly to the point where induced current enters the low resistance layer 310. Due to the low resistance of layer 310, the I²R heat drops when current flows therethrough. Hence, the heat applied to the fusible 302 is controlled by the Curie temperature of the layer 304.

With regard to the embodiment of FIG. 24 (and the following embodiments), it is preferable to provide the closest coupling practical between the primary winding of layer 306 and the secondary winding defined by layer 304 (and layer 310 when layer 304 has a low $\mu$). When the coupling is tight, the magnitude of the current I flowing in the secondary is substantially the same as that of the current flowing in the primary winding. The Joule heat I²R generated in the secondary winding is therefore proportional to R. Resistance R varies depending on the value of $\mu$ of layer 304, maintaining control over temperature as discussed previously.

Moreover tight coupling also enhances heating efficiency. This condition of tight coupling is thus preferred, although the device will also work with less than close, or tight coupling.

Figure 25:
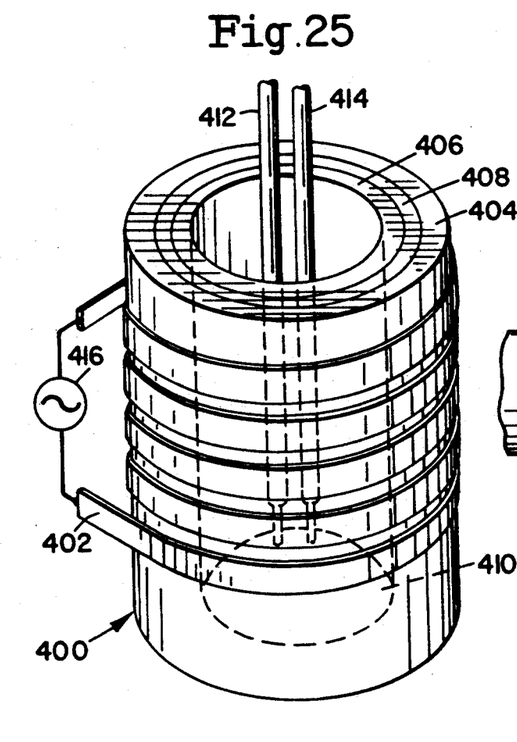
FIG. 25 is an illustration of a first specific inductive embodiment of the invention, showing a concentric structure.

Turning next to FIG. 25, an embodiment 400 including coaxial layers is illustrated. A primary winding 402 includes a plurality of turns coiled about an outer cylindrical layer 404 of insulation. Alternatively, the winding 402 may be sheathed by insulation which would obviate the need for insulation layer 404. The inner cylindrical layer 406 comprises a first magnetic layer of resistivity $\rho_1$ and permeability $\mu_1$. Interposed between layers 404 and 406 is a second magnetic layer 408—having a resistivity $\rho_2$ and permeability $\mu_2$. Both layers 406 and 408 are thermally conductive. A fusible 410 lying on the inner bottom surface of layer 406 is meltable to connect elements 41 and 414 together. As in the FIG. 24 embodiment, a.c. current from source 416 passes through primary winding 402 and induces current in the layer 408 when temperature is low. As the temperature approaches the Curie temperature of the layer 408, current enters the layer 406—so that current flows through both layers 406 and 408 in parallel. The heat applied to the fusible 410 is initially controlled by the Curie temperature of the layer 408. That is, below Curie the skin depth therein is small and the heat generated large. As Curie temperature is reached, skin depth increases dramatically to reduce the heat generated. As skin depth increases, however, current also enters the layer 406. Layer 406 then also effects the heat generated. For example, if layer 406 reaches its Curie temperature, another dramatic change in heating may be effectuated. Where the fusible 410 responds at successive temperatures to form a connection, the multiple-magnetic layer of the FIG. 25 embodiment may be particularly useful.

The term "solder" as used herein is not limited to mixtures of lead, but relates to any conductive material which is liquified by heat and which binds or unites when cooled. Given appropriate heating temperatures, brazing can be accomplished in much the same ways as have been described with solder. Aluminum is another particularly good material, since it can be made to wet other metals and forms a strong bond when cooled. Fusible materials, where electrical connections are not required, may constitute sealants or moisture resistance compounds to protect a junction, electrical or mechanical, against moisture and corrosive materials in the atmosphere.

Figure 26:
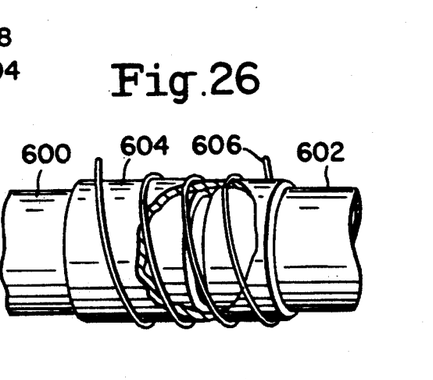
FIG. 26 is a partial cutaway view of a connector device actuated by a primary winding to connect two pipes or the like together with a heat recoverable sleeve.

In yet another embodiment showing an inductive source, FIG. 26 shows two pipes 600 and 602 being connected by a tubular heat recoverable sleeve 604. Encompassing the sleeve 604 is a primary winding 606 (sheathed by an electrical insulative covering) tightly coupled about the tubular sleeve 604. As noted above in various embodiments, the sleeve 604 may include magnetic material therein. In this manner, the sleeve 604 serves as a secondary inductor and a load which is heated. Specifically, current from the primary winding 606 induces a circumferential current in the sleeve 604 related thereto. The current is initially limited to a narrow depth of the outer skin of the sleeve 604 as the temperature of the sleeve 604 is below the Curie temperature of the magnetic material interspersed in the sleeve 604. As current flows through the narrow outer depth of the sleeve 604, $I^2R$ heat is generated. This $I^2R$ heat is sufficient to cause the sleeve 604 to heat shrink to engage and thereby connect the two pipes 600 and 602. When the temperature in the sleeve 604 approaches the Curie temperature, the permeability of the sleeve 604 drops and the current therein flows to greater depths. Hence, after recovery, the temperature of the sleeve 604 is regulated to a prescribed level determined by the Curie temperature. If the pipes 600 and 602 are of low electrical resistance, an additional effect is realized when current from the sleeve 604 penetrates through the sleeve 604 and into the pipes 600 and 602 responsive to the Curie temperature being approached. Namely, the current then flows through a low resistance to generate small or negligible $I^2R$ heat. Thus, after recovery and Curie temperature are reached, heating effectively stops. Of course, in addition to forming the sleeve 604 with magnetic material therein, a secondary inductor of magnetic material contiguously encircling a heat recoverable sleeve may alternatively be used with similar effect. Also, as required, circuit breakers may be included as previously disclosed.

Referring now to the embodiment of FIG. 8, the employment of an inductive source is briefly discussed. As an alternative to directly connecting a source S to the jaws 49 and 50, a primary coil electrically insulated from the jaws 49 and 50 is provided therearound. As a.c. current flows through the primary coil, current is induced in the jaws 49 and 50—acting as a closely—coupled secondary inductor—to produce considerable heat when the temperature is below the Curie temperature of the magnetic material. As the temperature approaches Curie, current spreads to reduce heating as was discussed previously with reference to FIG. 8.

It should be recognized that in many embodiments of these connectors, holes may be provided. These holes allow the passage of one or more of the fusible elements from one location to another upon activation of the heating operation of the connector. It should also be recognized that such holes need not materially affect the desired heating and autoregulation characteristic of these mechanisms. Thus, while we have described some of the functional utility of holes, slits and perforations at various locations within and/or without the heating element to accommodate or facilitate both the end use of the device and/or its heater operation functionality.

The term "constant current" as employed herein does not mean a current that cannot increase but means a current that obeys the following formula:

$$\frac{\Delta I}{I} < -\frac{1}{2}\frac{\Delta R}{R.} \tag{1}$$

Specifically, in order to autoregulate, the power delivered to the load when the heater exceeds Curie temperature, must be less than the power delivered to the load below Curie temperature. If the current is held invariable, then the best autoregulating ratio is achieved short of controlling the power supply to reduce current. So long, however, that the current is reduced sufficiently to reduce heating, autoregulation is achieved. Thus, when large autoregulating ratios are not required, constraints on the degree of current control may be relaxed thus reducing the cost of the power supply.

The above equation is derived by analyzing the equation:

$$P = (I + \Delta I)^2 (R + \Delta R) \text{ (where P is power)},$$

differentiating P with respect to R, $$\frac{dP}{dR} = (I[R])^2 + RI[R]\left(\frac{dI[R]}{dR}\right)$$

(where I[R] is I as a function of R) and to satisfy the requirements for autoregulation $$\frac{dP}{dR} < 0.$$

Thus, $$(I[R])^2 + 2R \, I[R]\left(\frac{dI[R]}{dR}\right) < 0$$

which reduces to Equation 1 above.

Once given the above disclosure, many other features, modifications and improvements will become apparent to the skilled artisan. Such other modifications, features and improvements are, therefore, considered a part of this invention, the scope of which is to be determined by the following claims. For example, it is noted that induction in an inductive source embodiment may be effectuated by a straight wire primary winding as well as a coil, the wire providing a field thereabout which may induce current in a magnetic layer and an optional lower resistance layer (when the $\mu$ of the layer falls) to provide the desired heating of a fusible.

Also with regard to employing an inductive source in embodiments featuring a short circuit upon the melting of the fusible, the primary winding is provided, as required, with a circuit breaker as disclosed hereinbefore. Further, if desired the fusible material in an inductive source embodiment may serve as a circuit maker or breaker as set forth in various embodiments by making or breaking the secondary circuit by an arrangement such as that shown in FIG. 16. Moreover, the heating of foamable plastic as well as solder or heat shrinkable material—as set forth in various embodiments of the invention—may be provided.

Similarly, an inductive source may be employed to provide a multi-temperature device as in the FIG. 21 embodiment for heating two different fusibles—e.g. solder, potting, heat foamable plastic, or the like. In such an embodiment rings 214 and 216 would have constant current induced therein.

What is claimed is:

1. A device for connecting two members, the device comprising:
   a heat recoverable sleeve, having two open ends, each of said two members being insertable into a different one of the two ends;
   a ferromagnetic material, and
   winding means for inducing current in said ferromagnetic material, said winding means being flux coupled to said ferromagnetic material;
   said ferromagnetic material disposed to generate heat in said heat recoverable sleeve responsive to development of current therein;
   said sleeve having a size recover temperature below the Curie temperature of the ferromagnetic material;
   said sleeve recovering to a memory configuration thereof to engage the members when inserted therein and upon said sleeve being heated to its recover temperature.

2. A device according to claim 1 wherein said sleeve and said ferromagnetic material comprises a single, unitary tubular structure.

3. A device according to claim 2 wherein the members are to have low electrical resistance; and
   wherein said ferromagnetic material is dimensioned to enable induced current to flow substantially in the members responsive to said ferromagnetic material approaching its Curie temperature,
   said sleeve engage the members when recovered.

4. A device according to claim 1 wherein the members have low electrical resistance; and
   wherein said magnetic material is dimensioned to enable induced current to flow substantially in the members in response to said ferromagnetic material approaching its Curie temperature,
   said sleeve engage members when recovered.

5. A device according to claim 1 or claim 2 or claim 3 or claim 4 wherein the members are electrically conductive pipes.

6. A plurality of devices according to claim 1 comprising
   a plurality of said devices and a single primary winding,
   the corresponding ferromagnetic material of each device being flux coupled to said single primary winding.

7. A device for connecting two members comprising:
   a heat recoverable sleeve having two open ends for receiving said members in the sleeve,
   ferromagnetic material in contact with said sleeve,
   a coil energized by an alternating current and when energized is flux coupled to said ferromagnetic material to heat said ferromagnetic material to a temperature approaching its Curie temperature,
   said sleeve having a recovery temperature below said Curie temperature,
   said sleeve upon heating to recovery temperature recovering to a memory configuration thereof to engage the members when inserted in said sleeve.

8. A device according to claim 7 wherein said sleeve and said ferromagnetic material comprise a single unitary tubular structure.

9. A device according to claim 1 or claim 7 wherein the ferromagnetic material is excited by a field developed by a constant current.

10. A coupling mechanism for joining materials and/or members comprising
    a coupling member including a ferromagnetic material and a heat shrink sleeve having a predetermined shrink temperature,
    said sleeve being adapted to receive a first member to be connected to another member,
    means adapted to develop flux induced losses in said ferromagnetic material sufficient to cause the temperature of said ferromagnetic material to approach its Curie temperature,
    said sleeve being in heat coupled relationship to said ferromagnetic material and having a predetermined shrink temperature below said Curie temperature whereby said sleeve shrinks and contacts and holds said materials or members when the temperature of the ferromagnetic material approaches its Curie temperature.

11. A coupling mechanism for joining materials and/or members comprising
    one of said members being a coupling member including a ferromagnetic material and a sleeve,
    said sleeve being adapted to receive and have a surface adapted to be in contact with a member to which it is to be connected,
    said ferromagnetic material being out of physical contact with said surface,
    means adapted to develop magnetic flux induced losses in said ferromagnetic material sufficient to cause the temperature of said ferromagnetic material to approach its Curie temperature,
    said sleeve being in heat coupled relationship to said ferromagnetic material and having a temperature below said Curie temperature at which said sleeve affects coupling of said members to each other.

12. A coupling mechanism according to claim 11 wherein
    said ferromagnetic material is embedded in the sleeve and provides an electrically conductive path axially of the sleeve.

* * * * *